United States Patent [19]

Rittler

[11] 4,337,295
[45] Jun. 29, 1982

[54] BOROSILICATE, OPAL GLASS ARTICLE

[75] Inventor: Hermann L. Rittler, Corning, N.Y.

[73] Assignee: Corning Glass Works, Corning, N.Y.

[21] Appl. No.: 103,413

[22] Filed: Dec. 13, 1979

[51] Int. Cl.³ .............................................. B32B 17/06
[52] U.S. Cl. ..................................... 428/410; 106/52;
106/54; 106/48; 428/426; 428/427; 501/63;
501/66; 501/70; 501/71
[58] Field of Search ............................ 106/54, 52, 48;
428/426, 410

[56] References Cited
U.S. PATENT DOCUMENTS

| | | | |
|---|---|---|---|
| 2,106,744 | 2/1938 | Hood et al. | 428/427 |
| 2,683,666 | 7/1954 | Duncan et al. | 106/52 |
| 2,684,911 | 7/1954 | Stookey | 106/52 |
| 2,691,855 | 10/1954 | Armistead | 106/52 |
| 2,965,503 | 12/1960 | Hagedorn et al. | 106/52 |
| 3,413,133 | 11/1968 | Stalego | 106/54 |
| 3,493,355 | 2/1970 | Wu | 106/54 |
| 3,645,711 | 2/1972 | Pirooz | 106/54 |
| 3,709,705 | 1/1973 | Hagedorn | 106/54 |
| 3,741,861 | 4/1971 | Andrieu | 428/410 |
| 4,130,680 | 12/1978 | Ference et al. | 428/410 |
| 4,187,094 | 2/1980 | Lu | 106/54 |

Primary Examiner—George F. Lesmes
Assistant Examiner—E. Rollins Buffalow
Attorney, Agent, or Firm—Clinton S. Janes, Jr.

[57] ABSTRACT

There is disclosed a borosilicate, opal glass article composed of a phase-separated, opacified interior portion completely encased within, and integral with, a transparent, single-phase glass, surface skin. The phase-separated portion contains borate-rich and silicate-rich phases so different in refractive index that light is scattered, and the glass may contain a titania-coupled colorant. The article may be produced by molding a glass charge while simultaneously extracting heat from a surface layer on the molded article to maintain such surface layer as a single-phase glass.

3 Claims, 2 Drawing Figures

BOROSILICATE, OPAL GLASS ARTICLE

RELATED APPLICATIONS

Ser. No. 103,415, filed of even date herewith in the names of J. Ference, J. E. Megles, and myself and entitled "Glass Article Having a Pattern Formed in Its Surface and Method", is concerned with production of an opal pattern in the transparent surface layer on articles which may otherwise be in accordance with the present application.

My application, Ser. No. 103,414, filed of even date herewith and entitled "Integral Vitreous Article Composed of Opaque and Transparent Portions and Method", is concerned with an article similar to that described herein, but of an alkaline aluminosilicate nature and opacified in a different manner.

BACKGROUND OF THE INVENTION

This invention relates to a borosilicate, opal glass article composed of a phase-separated, opacified interior portion completely encased within, and integral with, a transparent, single-phase glass surface skin. The invention further contemplates a method of producing such a borosilicate, opal glass article by controlled heat extraction during glass forming.

An opal glass is an otherwise transparent glass having a light scattering material dispersed within its mass. The glass and the dispersed material have refractive indices which are sufficiently different from one another that light entering the glass is scattered rather than transmitted. Hence, the glass article appears translucent or opaque depending on the size and concentration of the dispersed material. In the absence of a glass colorant, the opacifying material normally imparts a white appearance to the glass. A glass colorant imparts its normal color to opal glass, although lightened or bleached by the white of the opacifying material.

It has been customary to produce an opal glass by adding to a glass batch a material, such as a fluoride or a phosphate, which is dissolved in the base glass during the melting operation, and then precipitates out in particle form as the glass cools (spontaneous opal), or on reheating (reheat opal). Initially, a soda lime type glass was employed as the base glass for the production of opal glasses, and most present day, commercial opal glasses are still of that nature. A soda lime glass is particularly desirable because of ease in melting and working, and potentially good chemical resistance. However, such glasses are generally characterized by a relatively high thermal coefficient of expansion. Hence, they have a low resistance to heat shock, unless physically strengthened as by air tempering.

The advent of borosilicate glasses in the 1910-1920 decade greatly extended the service areas for glassware. These glasses, because of their generally low thermal coefficient of expansion, proved particularly useful in service areas where heat was involved, such as laboratory glassware and baking ware.

It soon became desirable to opacify, that is, render opaque by dispersed material, the new borosilicate glasses. However, these new glasses not only melted at much higher temperatures than previous soda lime glasses, but had distinctly different chemical characteristics, including material solubility characteristics. In particular, the known opacifying materials did not dissolve and precipitate in the borosilicate glasses in the same manner as had been experienced in previous soda lime glasses.

Some of the problems involved in producing borosilicate opals, and efforts at the solution of these problems, are described in U.S. Pat. No. 3,275,492, granted Sept. 27, 1966 to J. L. Herbert, and the teachings of that patent are incorporated herein by reference. The patent teaches, in accordance with its invention, that certain divalent metal oxides, e.g., ZnO, BaO, and CaO, are opacifying agents capable of being precipitated in particle form in borosilicate glasses within a defined composition range. While dense opal glasses can be produced in accordance with the teachings of the Herbert patent, it has proven difficult to achieve a high degree of chemical durability in conjunction with high opal density.

PURPOSES OF THE INVENTION

A basic purpose of the invention is to provide a novel type of borosilicate, opal glass article. Another purpose is to provide such an article with improved chemical durability characteristics. A particular purpose is to produce such an article from a glass that separates into two phases, one phase being dispersed in the other. A specific purpose is to produce such an article having acceptable chemical durability characteristics for use in food preparation and serving. Another specific purpose is to provide a glass article adapted to use in microwave cooking. A further specific purpose is to produce such a glass article having unique color characteristics imparted to the glass. Still another purpose is to provide glassware that will simulate stoneware and earthenware in appearance.

RELATED LITERATURE

In addition to the Herbert patent previously mentioned, attention is directed to these technical developments and patents illustrative thereof:

The phenomenon of phase separation in a borosilicate glass, and the use of this phenomenon in providing a reconstructed glass article composed essentially of a single, high-silica phase, are described in some detail in U.S. Pat. No. 2,106,744, granted Feb. 1, 1938 to Hood and Nordberg. Briefly, the procedure disclosed in this patent comprises forming a single-phase glass article from a borosilicate glass of particular composition, heat treating the formed glass article to separate the glass into a borate-rich phase and a silica-rich phase, dissolving the more readily soluble borate phase with water or acid to leave a porous, silica skeleton structure, and heat treating the porous glass structure to consolidate it into a nonporous glass, corresponding in shape to the original glass article, but substantially smaller in size.

A clear layer, or surface skin, of glass may be formed on an opal glass or glass-ceramic body by subsequent heat treatment of the body, as disclosed in U.S. Pat. No. 3,486,963 (Smith), by chemically treating the surface of the body with boric oxide vapors, as disclosed in U.S. Pat. No. 3,493,355 (Wu) and U.S. Pat. No. 3,653,862 (Lynch), or by ion exchange in the surface of the glass, as disclosed in U.S. Pat. No. 3,764,444 (Simmons).

A titania ($TiO_2$) opal glass, that is, a glass in which opacity results from the precipitation of titania particles, is disclosed in U.S. Pat. No. 2,691,855 (Armistead). This patent discloses the use of such an opal glass in a thermometer tube, and the production of opacity by the reheating that occurs when a molten backing glass is applied over the opal glass in thermometer tube forming. The glass contains 8–25% $TiO_2$ as a requisite to obtaining opal particle formation.

The use of titania, in conjunction with other oxides as a glass colorant, is disclosed, for example, in U.S. Pat. Nos. 2,683,666 (Duncan), 2,321,987 (Brown), and 2,965,503 (Hagedorn et al.).

SUMMARY OF THE INVENTION

The article of the invention is an integral vitreous article composed of an internal opaque portion encased within a continuous, unbroken, surface layer of transparent glass, the vitreous article having a uniform elemental composition of a borosilicate nature throughout its mass, the internal portion being composed of a borate-rich phase separated from and dispersed throughout a silicate-rich phase, the two glass phases being of such different refractive index as to create an opaque mass, and the surface layer being a single-phase borosilicate glass. In a presently preferred embodiment, the article contains a titania-coupled colorant. In general, the uniform elemental composition of the article, as calculated from the glass batch in weight percent on an oxide basis, may consist essentially of 55–80% $SiO_2$, 5–18% $TiO_2$, 4–15% $B_2O_3$, 3–20% of at least one mono- or divalent modifying oxide, and, optionally, a minor amount of a titania coupler, and up to 10% $Al_2O_3$.

The article may be produced by melting borosilicate glass that is capable of phase separation upon cooling, delivering the molten glass to a forming surface, forming the glass to shape while extracting heat from a surface layer on the glass at a sufficiently rapid rate to maintain the surface layer as a single-phase glass, and cooling the interior portion of the glass body at a slower rate whereby it separates into two glass phases.

DESCRIPTION OF THE DRAWING

The invention is further described with reference to the attached drawing wherein.

GENERAL DESCRIPTION

Figure 1:
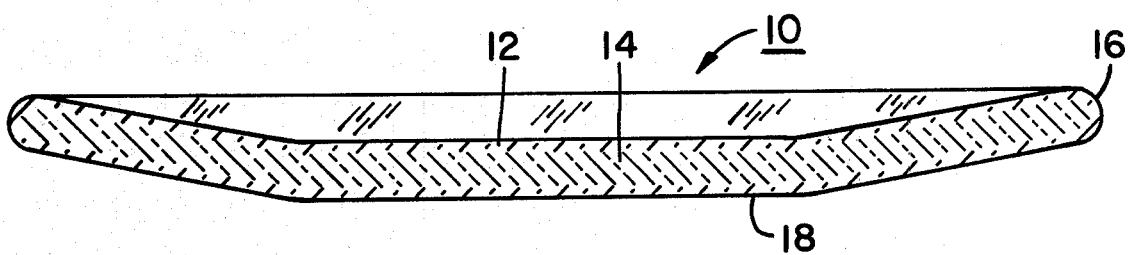
FIG. 1 is a cross-section view of a glass plate in accordance with the invention.

FIG. 1 illustrates the invention as a circular glass plate 10 having a thin skin or surface layer 12 of clear glass encasing an opaque interior portion 14. As illustrated, plate 10 has a thin edge section 16 composed entirely of clear glass. In contrast, the central portion 18 of plate 10 appears opaque due to an opacified interior 14.

A key feature of the invention, then, is selective development of opacity in a glass article by controlled heat extraction from a body of glass while it is being molded. Thus, surface layer 12 is rapidly chilled or quenched to prevent phase separation, while interior portion 14 is cooled less rapidly, thus permitting separation of the glass into a silica-rich phase and a borate-rich phase in known manner. In accordance with the method aspect of the invention, this is achieved in conjunction with molding of an article against a forming surface such as a conventional glass press, a sheet glass roll, or other suitable former.

Figure 2:
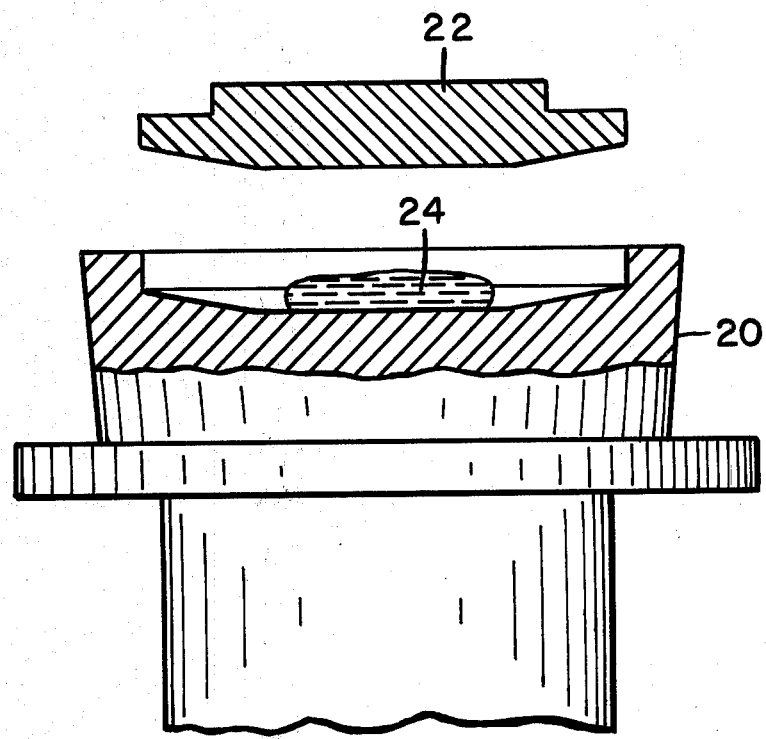
FIG. 2 illustrates, schematically, a method of producing such plate.

FIG. 2 schematically illustrates a glass pressing process wherein glass plate 10 is pressed from a gob of molten glass 24 by the combined action of mold 20 and pressing plunger 22. Initially, glass gob 24 is delivered to mold 20 in known manner. Plunger 22 is then moved downward into the mold cavity and against glass gob 24 to force the molten glass into a confined space between the respective pressing surfaces of mold 20 and plunger 22. As is well known, these pressing tools are so designed and machined as to provide a space corresponding to a desired dish shape intermediate their pressing surfaces.

It has been found that the glass contacting surfaces of mold 20 and plunger 22 may be sufficiently chilled to extract heat from the glass surface at such a rapid rate that surface layer 12 becomes highly viscous or stiff before phase separation can occur. Thus, a single-phase glass state is frozen in surface layer 12. This layer is clear and transparent so that it transmits, rather than diffuses or scatters, incident light. The clear surface layer thus formed may be seen as a thin layer in cross-section, or as a clear rim section 16 on plate 10.

In contrast, however, the body of plate 10 will not chill, or become frozen, throughout. As a consequence, a frozen clear skin 12 forms over an interior portion 14 that cools more slowly. During this slower cooling, the interior glass has an opportunity to separate into two phases of such different refractive index that opacity results.

In order to produce a clear glass layer of appreciable depth, the glass surface must be cooled very rapidly by quenching from the molten condition. The thickness of the clear glass layer thus formed will increase as the rate of heat extraction, that is, the quench rate, increases. This thickness, while not critical, normally will not exceed ten mils (0.25 mm.), and is usually about five mils (0.13 mm.). The essential requirement, of course, is a continuous, unbroken skin which might be as thin as several microns.

Those skilled in the glass art will appreciate that the rate of heat extraction may be changed in various ways. Thus, the molding surfaces may be cooled by interior circulation of water in the mold and/or plunger members. Alternatively, cooling fluid, either liquid or gaseous, may be applied directly to the molding surfaces. Also, the mold metals employed may be selectively chosen to effect a greater or lesser rate of heat transfer. Furthermore, it will be appreciated that the principles and practices, here described with reference to glass pressing and the forming surfaces on press elements, are equally applicable to rolling or sheet forming operations and the rolls there used, as well as other glass formers.

As noted earlier, the phenomenon of phase separation in certain borosilicate glasses is not new. Rather, it has been recognized and used for at least forty years in a unique process of producing high silica content glasses. In this prior procedure, a borosilicate glass is separated into two phases, one a borate-rich phase and the other a silicate-rich phase. The borate phase is removed and disposed of, while the silica phase is consolidated into a non-porous glass characterized by high silica content, visual clarity, and low coefficient of thermal expansion.

The opacifying effect of the borate phase was inherently present in the phase-separated material. Nonetheless, this borate phase was recognized only as a soluble phase to be removed and disposed of in production of a single-phase, transparent product. The phase-separated glass, as such, then did not appear to have any practical utility because of its poor chemical durability. This condition was obvious from the fact that the borate phase readily dissolved in acid, or even in hot water. Thus, such a glass would be entirely unsuitable for contact with food or beverage.

A feature of the present invention is provision of means to take advantage of the opal condition produced by phase separation in a phase-separable, borosilicate glass. This may be accomplished by so molding a phase-separated glass article as to retain a thin surface skin in an unseparated or single-phase state. Thus, the phase-separated interior contributes opacity, while the unseparated surface skin contributes a relatively insoluble surface. The durability of the latter can be controlled by glass composition adjustment.

Another feature is the production of opacity in a borosilicate glass without addition to the glass batch of a material that precipitates on cooling. Thus, use of volatile materials, which may cause atmospheric and/or mold pollution, is avoided. Also, a low expansion, heat resisting glass is provided that is particularly suitable for applications involving food and beverage preparation and serving. At the same time, these glasses have thermal and viscosity characteristics which permit their being melted and worked in known manner with conventional equipment.

One preferred embodiment employs glasses that have good compatibility with microwave oven use. In this connection, glass is generally recognized as a good material for microwave heating because of its transmission capabilities for such waves. However, it has been found that some glasses have superior transmission characteristics, that is, less tendency to absorb microwaves as thermal energy. An empirical test used to screen glasses involves heating a dish for five (5) minutes in an oven of specified power and observing the surface temperature of the dish. In general, measured temperatures should not exceed 100° C. and preferably are on the order of 50° C.

Finally, the present invention provides a unique means of color formation in the glass. Thus, the presence of titania in conjunction with other materials, in particular metal oxides and precious metals, produces color couples that impart unique colors. One particularly desirable combination is titania and ceria which produces a tan-to-brown color and, in proper proportions, simulates the earth tones of stoneware.

Borosilicate glasses, found useful for purposes of the present invention, consist essentially of silica ($SiO_2$), boric oxide ($B_2O_3$), titania ($TiO_2$) and at least one modifying oxide selected from the monovalent ($R_2O$) and divalent (RO) alkaline oxides, preferably $Na_2O$, $K_2O$, BaO, CaO, MgO, and/or SrO. At least one metal oxide or noble metal, capable of coupling with titania, may also be present in minor amounts for colorant purposes.

$SiO_2$ and $B_2O_3$ are the glass forming oxides. At least 55% $SiO_2$ is required to provide a glass that is stable and chemically durable in the single-phase state, but also capable of phase separation. With more than 80% $SiO_2$, the glass is difficult to melt. It also tends not to phase separate, even when cooled slowly.

At least 4% $B_2O_3$ is required to enable phase separation. More than 15% hurts durability in the skin glass or single-phase state. Also, the total $SiO_2+B_2O_3$ should not exceed 86%.

Titania plays several roles. It appears to facilitate phase separation, tending to enter the borate phase. Also, it couples with the precious metals or metal oxides to produce color in the article. At least 5% is desirable, but amounts greater than about 18% render the glass too fluid for ease in conventional glass delivery and working. It has also been observed that glasses with high titania contents tend to become hot when exposed to microwave energy, as when a dish is used in a microwave oven. This suggests that this oxide, in the glass, tends to absorb microwaves.

At least one modifying oxide is necessary to flux the glasses, that is, facilitate their melting. Soda ($Na_2O$) is generally selected, although one or more other alkali metal or alkaline earth metal oxides may be employed to provide secondary property control such as durability, density, coefficient of thermal expansion, and temperature-viscosity adjustment. In any case, the total content of such oxides should be limited because of a tendency to raise the coefficient of thermal expansion and to increase the absorption of microwave energy. Preferably then, the RO+$R_2O$ content does not exceed 20% and $R_2O$ does not exceed 6%.

Alumina enhances chemical durability of these glasses, but increasing amounts tend to harden the glass and stabilize it against phase separation. Hence, up to 10% of this oxide may be tolerated, depending on other oxides present, but generally a content not over 5% is preferred.

Other oxides may be present in minor amounts up to a few percent. However, since they often tend to interfere with phase separation, care must be taken. Among those contemplated are zirconia, phosphate and zinc oxide.

Titania couples with virtually all of the oxides outside Groups I and II of the Periodic Table to form unique color effects. The content of such oxide couplers is not critical, except with respect to color control. In general, at least 0.1% by weight of a coupler oxide is present, with the content being as great as 5% in some cases.

Titania also couples with the noble metals to provide still further unusual color effects. Again, the content of the noble metal is only critical with respect to color reproduction. However, the effective content of a noble metal is usually much lower than that of an oxide coupler. Thus, an amount as low as 0.001% by weight may be effective in some instances, and amounts greater than 1%, while tolerable, usually serve no useful purpose.

The nature of the coloring effect is not fully understood. It is believed titania may couple with an oxide to form a spinel-type structure which, if small enough, does not scatter visible light, and hence does not produce opacity. To the extent that such couples do exist as particles, they are less than one micron, and preferably less than 7000 Angstrom units, in size.

The general features and parameters of the invention having been set forth and described to the extent practical, the invention is further described with reference to specific illustrative embodiments.

SPECIFIC EMBODIMENTS

Table I below sets forth, in percent by weight as calculated from the batch on an oxide basis, the composition for each of several glasses found useful in practicing the invention.

TABLE I

|  | 1 | 2 | 3 | 4 | 5 | 6 | 7 | 8 | 9 | 10 | 11 | 12 |
|---|---|---|---|---|---|---|---|---|---|---|---|---|
| $SiO_2$ | 68.5 | 65 | 64.0 | 56.5 | 69 | 67 | 71 | 72 | 75 | 66 | 70 | 70 |
| $TiO_2$ | 16 | 16 | 15.6 | 15 | 15 | 15 | 15 | 10 | 11 | 15 | 11 | 11 |
| $B_2O_3$ | 10 | 10 | 5.2 | 5 | 7 | 7 | 5 | 10 | 5 | 10 | 10 | 10 |

TABLE I-continued

| | | | | | | | | | | | | |
|---|---|---|---|---|---|---|---|---|---|---|---|---|
| $Al_2O_3$ | 2 | 2 | 4.2 | 10 | — | — | — | — | — | — | — | — |
| CaO | — | — | 2.1 | 4 | 5 | — | 5 | 5 | 5 | 5 | 5 | 5 |
| MgO | — | — | 3.1 | 3 | — | — | — | — | — | — | — | — |
| ZnO | — | — | — | — | — | 7 | — | — | — | — | — | — |
| $Na_2O$ | 3 | 6 | 2.1 | 2 | 3 | 3 | 3 | 3 | 3 | 3 | 3 | 3 |
| $K_2O$ | — | — | 1.6 | 2 | — | — | — | — | — | — | — | — |
| $Cr_2O_3$ | 0.5 | 1.0 | — | — | — | — | — | — | — | — | — | — |
| $CeO_2$ | — | — | — | 0.5 | — | — | — | — | — | — | — | — |
| $As_2O_3$ | — | — | — | 1 | 1 | 1 | — | 1.0 | 1.0 | 1.0 | — | — |
| $Fe_2O_3$ | — | — | 2.1 | 2.0 | — | — | — | — | — | — | — | — |
| CdO | — | — | — | — | — | — | — | — | — | — | — | 1.0 |

| | 13 | 14 | 15 | 16 | 17 | 18 | 19 | 20 | 21 | 22 | 23 | 24 |
|---|---|---|---|---|---|---|---|---|---|---|---|---|
| $SiO_2$ | 67 | 69 | 59.4 | 71.9 | 71.5 | 77.5 | 75.4 | 71 | 66 | 71.8 | 71.8 | 77.5 |
| $TiO_2$ | 15 | 10 | 14 | 10 | 10 | 9 | 5 | 15 | 10 | 10 | 10 | 10 |
| $B_2O_3$ | 5 | 10 | 10 | 10 | 10 | 5 | 6 | 5 | 12 | 10 | 10 | 5 |
| $Al_2O_3$ | 5 | — | 2 | — | — | — | 2 | — | 2 | — | — | — |
| CaO | — | 5 | 5 | 5 | 5 | 5 | 5 | 5 | — | 5 | 5 | — |
| MgO | 4 | — | 1 | — | — | — | 1 | — | 6 | — | — | 3.5 |
| $Na_2O$ | 3 | 3 | 3 | 3 | 3 | 3 | 4 | 3 | 3 | 3 | 3 | 3 |
| $P_2O_5$ | — | 3 | 4 | — | — | — | 0.5 | — | — | — | — | — |
| $Li_2O$ | — | — | 0.5 | — | — | — | 0.5 | — | — | — | — | — |
| CuO | — | — | — | 0.1 | — | — | — | — | — | — | — | — |
| $SO_2$ | — | — | — | — | 0.5 | — | 0.5 | — | — | — | — | — |
| $As_2O_5$ | 1.0 | — | 1.0 | — | — | 0.5 | — | 1 | 1 | — | — | 1 |
| $CeO_2$ | — | — | 0.1 | — | — | — | 0.1 | — | — | — | — | — |
| NiO | — | — | — | — | — | — | — | — | — | 0.2 | — | — |
| $SeO_2$ | — | — | — | — | — | — | — | — | — | — | 0.2 | — |

| | 25 | 26 | 27 | 28 | 29 | 30 | 31 | 32 | 33 |
|---|---|---|---|---|---|---|---|---|---|
| $SiO_2$ | 70 | 70 | 71 | 70.4 | 72.8 | 78 | 78.5 | 64 | 80.5 |
| $TiO_2$ | 10 | 10 | 10 | 14 | 12 | 12 | 12 | 5 | 10 |
| $B_2O_3$ | 10 | 10 | 10 | 4 | 12 | 6 | 6 | 10 | 6 |
| $Al_2O_3$ | — | — | — | 0.5 | — | — | — | — | — |
| CaO | 5 | 5 | 5 | 5 | — | — | — | — | — |
| $Na_2O$ | 3 | 3 | 3 | 4 | 1.4 | — | 1 | 3 | 1.5 |
| $K_2O$ | — | — | — | — | — | 1.5 | — | — | — |
| $P_2O_5$ | — | — | — | 1 | — | — | — | — | — |
| $Li_2O$ | — | — | — | 0.3 | 0.8 | 1.5 | 1.5 | — | 1 |
| BaO | — | — | — | — | — | — | — | 17 | — |
| MnO | 2 | — | — | — | — | — | — | — | — |
| NiO | — | 2 | — | — | — | — | — | — | — |
| $V_2O_5$ | — | — | 1 | — | — | — | — | — | — |
| $As_2O_5$ | — | — | — | 0.5 | 1 | 1 | 1 | 1 | 1 |
| $CeO_2$ | — | — | — | 0.3 | — | — | — | — | — |

A two pound batch, corresponding to each composition, was mixed and ballmilled to improve batch homogeneity. Each batch was melted in a silica crucible at 1600° C. for 16 hours. Test samples, in various forms, were prepared from the glass in each melt for observation and property measurement. The results are recorded in Table II below.

Detergent durability (DD) of a glass was determined by immersing a glass sample in a 0.3% solution of Super Soilax ® detergent at 95° C. for a determined length of time. The sample was then removed, and the surface rated for residual appearance, change of color, and loss of gloss. An "A" rating indicates a clean surface, that is, one free of residue when rinsed. Change of color and change of gloss are serially recorded, with "0" indicating no apparent change and "1" a barely perceptible change. A readily noticeable change is rated "2". The number under the rating numbers is the test duration in hours, thus, 112 hours for Examples 1 through 5.

"Exp." refers to the coefficient of thermal expansion over the range zero to 300° C., with the value given being multiplied by $10^{-7}$ for the actual value per degree C.

M.W. indicates the surface temperature measured on a glass dish after an empirical test for microwave absorption and consequent increase in temperature. A dish, e.g. a plate such as plate 10, is placed in a 750-watt microwave oven operating at full load for a period of five (5) minutes with 500 c.c. of water in a container to simulate a food load. Surface temperature on the dish is recorded as a relative or comparative measure of microwave absorption by the glass. A higher temperature in a given glass indicates a greater degree of absorption, and, hence, a lower degree of transmission to material being heated in a dish. In general, measured temperatures should not exceed 100° C. and preferably are on the order of 50° C.

TABLE II

| | 1 | 2 | 3 | 4 | 5 | 6 |
|---|---|---|---|---|---|---|
| D.D. | A01 | A02 | A02 | A00 | A02 | A02 |
| | 112 | 112 | 112 | 112 | 112 | 48 |
| Exp. | 44 | 64 | — | — | 43 | 47 |
| M.W. | 61 | 69 | 56 | 54 | 53 | 55 |
| Color | Dark brown | Orange-brown | Blue-black | Black | Light beige | Greyish white |

| | 7 | 8 | 9 | 10 | 11 | 12 |
|---|---|---|---|---|---|---|
| D.D. | A02 | A02 | A02 | A02 | A01 | A00 |
| | 112 | 112 | 112 | 112 | 112 | 48 |
| M.W. | 55 | 55 | — | 55 | 57 | 53 |
| Color | White | Creamy beige | Beige | Beige | Ivory | Beige |

| | 13 | 14 | 15 | 16 | 17 | 18 |
|---|---|---|---|---|---|---|
| D.D. | A00 | A00 | — | A01 | A02 | A01 |
| | 112 | 48 | | 112 | 112 | 112 |
| M.W. | 55 | 52 | — | 56 | 56 | 44 |
| Color | Greyish | Powder blue | Glossy white | Yellow | Greyish lavender | Greyish white |

TABLE II-continued

| beige | | | | | |
|---|---|---|---|---|---|
| | 19 | 20 | 21 | 24 | 28 |
| D.D. | A01 | A02 | A02 | A02 | A02 |
| M.W. | 74 62 | 112 49 | 112 56 | 48 49 | 112 62 |
| Color | Greyish blue | White | Greyish blue | Greyish blue | Cream |

Table III illustrates the variety of color effects attainable in the present glass by titania coupled to other oxides and to noble metals. The base glass employed was composed, in percent by weight, of 72% $SiO_2$, 10% $TiO_2$, 10% $B_2O_3$, 5% and CaO and 3% $Na_2O$.

Glass batches were formulated in which an effective amount of coupler was substituted for silica on a weight percent basis. Thus, the addition of 1% coupler was accompanied by reducing silica to 71% and keeping the other oxides constant.

Two pound batches were prepared, ballmilled to improve homogeneity, and then melted in silica crucibles held at 1600° C. for 16 hours. Each melt was poured into a press mold and pressed into a ten inch diameter dinner plate.

Table III records the colors observed in the pressed plates.

TABLE III

| Additive | Amount % by Wt. | Appearance |
|---|---|---|
| NiO | 0.2 | Mottled grey brown |
| NiO | 2.0 | Grey |
| $V_2O_5$ | 1.0 | Grey green |
| MnO | 2.0 | Yellow green |
| $Cr_2O_3$ | 1.0 | Yellow brown |
| $Cr_2O_3$ | 0.2 | Peppermint green |
| CoO | 0.03 | Blue black |
| CuO | 1.0 | Yellow brown |
| $SeO_2$ | 0.2 | Mottled grey brown |
| $TeO_2$ | 0.3 | Grey green |
| $As_2O_5$ | 1.0 | Greyish yellow |
| $Sb_2O_3$ | 0.5 | Grey |
| $MoO_3$ | 1.0 | Blue grey |
| $SnO_2$ | 0.1 | Greyish brown |
| $CeO_2$ | 3.0 | Brown beige |
| $CeO_2$ | 0.5 | Yellow |
| $Fe_2O_3$ | 2.0 | Blue black |
| Ag | 0.1 | Orange lavender |
| Au | 0.02 | Blue lavender |
| $P_2O_5$ | 1.0 | Creamy white |
| $SO_2$ | 0.5 | Blue white |
| $Nb_2O_5$ | 1.0 | Grey beige |
| $Nd_2O_5$ | 0.2 | Grey white |
| CdO | 1.0 | Beige lavender |

A second set of batches was mixed and milled as above. These batches were derived from a base glass composed of 76% $SiO_2$, 9% $TiO_2$, 5% $B_2O_3$, 5% CaO, 3% $Na_2O$, 1% $As_2O_5$, 0.5% $P_2O_5$ and 0.5% $Li_2O$. Again, the additions were substituted for an equal amount of $SiO_2$. The batches were melted as above, the melts poured into a press mold, and plates pressed as described with reference to Table III. The appearance of the plates is shown in Table IV.

TABLE IV

| Additive | Amount % by Wt. | Appearance |
|---|---|---|
| CuO | 0.1 | Yellow |
| $Sb_2O_3$ + $CeO_2$ | 0.2 + 0.5 | Creamy yellow |
| $Fe_2O_3$ + $CeO_2$ | 0.5 + 0.5 | Brown |
| Ag | 0.02 | Blue |
| Pt | 0.05 | Blue-grey |
| Rh | 0.05 | Brown-grey |

TABLE IV-continued

| Additive | Amount % by Wt. | Appearance |
|---|---|---|
| Ru | 0.02 | Brown-black |

The invention is further illustrated by describing a larger scale method of practice using a glass having the composition of Example 3 in Table I as Glass A. Glass B was a glass having the following analyzed composition, in percent by weight, with silica being determined by difference:

| | |
|---|---|
| $SiO_2$ | 71.8 |
| $TiO_2$ | 14.1 |
| $ZrO_2$ | 1.1 |
| $B_2O_3$ | 5.1 |
| CaO | 4.9 |
| $Na_2O$ | 2.6 |
| $As_2O_3$ | 0.4 |

Commercially available raw materials, including sand, alumina, titania, zirconia, soda ash, lime, magnesia, borax, and arsenic pentoxide, were mixed in suitable proportions to form the necessary batches for melting. Each batch was melted in a small tank capable of providing a 400 to 700 pound melt. The tank, filled with batch, was held at a temperature of 1600° C. for 55 hours to effect melting. Oxygen was bubbled through the melt to homogenize it. This was discontinued, about an hour before glass delivery started, to avoid seeds.

Glass A was delivered from the tank by two different techniques. The melt was raised to 1650° C., and the glass removed by ladling. Subsequently, the temperature was lowered into the range of 1520°-1540° C., and glass was gathered from the melt. In each case, glass charges were deposited in a press mold and ten-inch dinner plates pressed from the glass.

As a variation, a unique decorative technique was employed on certain of the pressed plates. This technique consisted of momentarily touching the center of the upper surface of a glass charge with a graphite decorative stamp, that is, a graphite member having a desired pattern machined into its glass contacting surface. When the glass charge was then pressed to form a plate in the usual manner, a surface opal pattern, corresponding in form to the stamp pattern, spontaneously formed in the center of the plate. Such decorated article, and the technique of producing it, are further described in a related application noted earlier.

Glass B was delivered from the melting chamber by gathering the molten glass at a temperature of about 1500° C. The gathers were deposited in a press mold and pressed into plates, as with Glass A.

The following properties were observed or measured on the pressed plates, or on test samples removed therefrom:

| | A | B |
|---|---|---|
| Color | Blue-black | Creamy white |
| Annealing Point (°C.) | 682 | 655 |
| Strain Point (°C.) | 620 | 595 |
| Expansion × $10^{-7}$/°C. | 46.8 | 40.2 |
| Density gm./cm.$^3$ | 2.723 | 2.453 |

Various durability tests were conducted comparing the two glasses with each other and with a commercial tempered opal of a soda lime type. All of the glasses are rated "A" for cleanability (that is, show no residue) after 120 hours in the Super Soilax ® detergent test described earlier. Also, there was no apparent change in color in 120 hours, but some loss of gloss could be noticed on each of Glasses A and B.

As noted earlier, resistance to acidic attack is very important in dishes used for food and beverages. One comparative test is to measure weight loss in mg./cm.$^2$ on surfaces exposed to an acidic solution. Glass A was compared to the commercial opal in both a 5% HCl acid solution and a 10% citric acid solution. In each case, the glass was immmersed for 24 hours at 95° C. The measured weight losses on Glass A were, respectively, 0.03 and 0.02 mg./cm.$^2$, while those on the commercial opal were 0.13 and 0.25 mg./cm.$^2$. In alkaline solutions, the glasses were reasonably comparable with an expected edge in favor of the alkaline commercial opal.

The glasses were also tested for microwave heat-up as described earlier. After the five minute heating cycle, Glass A showed a temperature of 71° C., but still could be handled. Glass B measured 50° C. and, while noticeably warm, could be readily handled.

I claim:

1. An integral, colored spontaneous opal glass article composed of an internal, opaque portion encased within a continuous, unbroken surface layer of transparent glass, the vitreous article having a uniform elemental composition throughout its mass, consisting essentially, expressed in weight percent on the oxide basis as calculated from the batch, of 55-80% $SiO_2$, 5-18% $TiO_2$, 4-15% $B_2O_3$, 3-20% of at least one mono- or divalent metal oxide selected from the group of $Na_2O$, $K_2O$, BaO, CaO, MgO, and SrO, the total monovalent metal oxide content not exceeding 6%, and a $TiO_2$ coupler selected from the group in the indicated propotions of 0.1-5% of an oxide capable of coupling with $TiO_2$ selected from the group of $As_2O_5$, CdO, $CeO_2$, CoO, $Cr_2O_3$, CuO, $Fe_2O_3$, MnO, $MoO_3$, NiO, $Nb_2O_5$, $Nd_2O_3$, $P_2O_5$, $Sb_2O_3$, $SeO_2$, $SnO_2$, $SO_2$, $TeO_2$, and $V_2O_5$, and 0.001-1% of a noble metal capable of coupling with $TiO_2$ selected from the group of Ag, Au, Pt, Rh, and Ru, the internal portion being composed of a borate-rich phase separated from and dispersed throughout a silicate-rich phase, the two glass phases being of such different refractive index as to render said internal portion opaque, and the surface layer being a transparent, single-phase borosilicate glass.

2. An article in accordance with claim 1 in which the composition additionally contains up to 10% $Al_2O_3$.

3. An article in accordance with claim 1 wherein the surface layer contains titaniferous particles less than 7000 Å in size.

* * * * *

UNITED STATES PATENT AND TRADEMARK OFFICE
CERTIFICATE OF CORRECTION

PATENT NO. : 4,337,295

DATED : June 29, 1982

INVENTOR(S) : Hermann L. Rittler

It is certified that error appears in the above-identified patent and that said Letters Patent are hereby corrected as shown below:

Column 7, line 10, delete line beginning with "$As_2O_3$" and substitute therefor -- $As_2O_3$ - - - - 1 1 1 - 1.0 1.0 1.0 - --.

Column 8, last line, under "Greyish" in Example 13, insert -- beige --.

Column 9, line 2, delete "beige".

Signed and Sealed this

Sixteenth Day of November 1982

[SEAL]

Attest:

GERALD J. MOSSINGHOFF

Attesting Officer    Commissioner of Patents and Trademarks